(12) United States Patent
Hardy et al.

(10) Patent No.: US 9,858,301 B1
(45) Date of Patent: Jan. 2, 2018

(54) SELECTIVE FLUSHING OF A DATABASE JOURNAL FOR AN ASYMMETRICALLY-ENCRYPTED DATABASE

(71) Applicant: Amazon Technologies, Inc., Seattle, WA (US)

(72) Inventors: Steven Alexander Hardy, Delft (NL); Mark Swaanenburg, Rijswijk (NL)

(73) Assignee: Amazon Technologies, Inc., Seattle, WA (US)

(*) Notice: Subject to any disclaimer, the term of this patent is extended or adjusted under 35 U.S.C. 154(b) by 349 days.

(21) Appl. No.: 14/601,050

(22) Filed: Jan. 20, 2015

(51) Int. Cl.
*G06F 17/30* (2006.01)

(52) U.S. Cl.
CPC .. *G06F 17/30303* (2013.01); *G06F 17/30185* (2013.01); *G06F 17/30345* (2013.01); *G06F 17/30867* (2013.01)

(58) Field of Classification Search
CPC ......... G06F 17/30303; G06F 17/30867; G06F 17/30345; G06F 17/30185
USPC .... 707/648, 662, 664, 692, 999.202; 714/20
See application file for complete search history.

(56) References Cited

U.S. PATENT DOCUMENTS

| | | | | |
|---|---|---|---|---|
| 7,433,898 B1* | 10/2008 | Georgiev | ............... | G06F 11/203 |
| 7,979,400 B2* | 7/2011 | Barsness | ........... | G06F 17/30501 |
| | | | | 707/662 |
| 8,200,627 B2* | 6/2012 | Youngren | ......... | G06F 17/30008 |
| | | | | 707/624 |
| 2002/0019827 A1* | 2/2002 | Shiman | ............. | G06F 17/30011 |

OTHER PUBLICATIONS

Fan et al., An Enhanced Journaling Method for Clustered File System with Shared Storage, 2010 3rd International Conference on Advanced Computer Theory and Engineering (ICACTE), Year: 2010, vol. 6, pp. V6-78-V6-81.*

* cited by examiner

*Primary Examiner* — Greta Robinson
(74) *Attorney, Agent, or Firm* — Klarquist Sparkman, LLP

(57) ABSTRACT

In one embodiment, entries in a database journal in a non-interactive mode can be partially flushed to maintain database performance. In particular, data records that require decryption prior to flushing a database journal entry can be bypassed in non-interactive mode, while data records that need not be decrypted can be flushed. For example, entries that relate to a creation or deletion of a data record can be performed, while entries relating to modification of an existing record can be bypassed and processed during an interactive mode of operation. Other embodiments also include a transformation of the database journal using a filter so that multiple entries to a same record can be combined.

20 Claims, 8 Drawing Sheets

SELECTIVE FLUSHING OF A DATABASE JOURNAL FOR AN ASYMMETRICALLY-ENCRYPTED DATABASE

BACKGROUND

Cloud computing is the use of computing resources (hardware and software) which are available in a remote location and accessible over a network, such as the Internet. Users are able to buy these computing resources (including storage and computing power) as a utility on demand. Cloud computing entrusts remote services with a user's data, software and computation. Use of virtual computing resources can provide a number of advantages including cost advantages and/or ability to adapt rapidly to changing computing resource needs.

Cloud computing environments can include database systems. Database systems typically include a database manager that maintains the integrity of a database as changes are made. The changes are recorded in a database journal (usually a circular log in a dedicated area of the system) before committing the changes to the database. Thus, the journal is a listing of pending changes to be made to database records. In the event of a system crash or power failure, such database systems are quicker to bring back online and less likely to become corrupted using the journal. Journaling can also be applied to file systems. After a crash, recovery simply involves reading the journal from the database or file system and replaying changes from the journal until the system is consistent again. Updating file or database systems to reflect changes to files and/or data usually requires many separate write operations.

Some database or file systems allow the journal to grow, shrink and be re-allocated just as a regular file. Some file systems may also allow external journals on a separate device, such as a solid-state disk or battery-backed non-volatile RAM. Changes to the journal may themselves be journaled for additional redundancy, or the journal may be distributed across multiple physical volumes to protect against device failure.

Flushing the journal (i.e., committing the changes in the journal to the database) is most efficiently done by acting on multiple journal entries close in time. Thus, a database manager can wait until a predetermined number of journal entries are reached and then flush the entirety of the journal as a single task before returning to other tasks. Once the journal is flushed (e.g., all entries are saved to disk) the journal can be cleared and readied for refilling. However, in systems where the journal entries cannot be cleared, the journal can become large, which decreases efficiency and increases a likelihood of error.

Nonetheless, journal management is desirable to maintain the journal at as small as possible so as to increase efficiency during flushing.

DETAILED DESCRIPTION

An asymmetric database environment is one where data is stored encrypted such that at least two separate keys are required to decrypt a data record. The term "asymmetric" stems from the use of different keys to perform opposite functions, each the inverse of the other—as contrasted with conventional ("symmetric") cryptography which relies on the same key to perform both. Typically, one of the keys is a private key and one key is a public key that are mathematically linked. The public key is used to encrypt plain text or to verify a digital signature, whereas the private key is used to decrypt ciphertext or to create a digital signature.

In asymmetric database environments, a database manager cannot always flush a database journal. For example, a database manager might not have access to both keys so that the journal is un-flushable in some contexts. Specifically, to modify a data record, the database manager needs to read the record, which requires a decrypted version of the record. In a non-interactive mode, wherein a user in not logged in, the database manager is unable to decrypt the record making the modification impossible. Nonetheless, other types of journal entries can be flushed in the non-interactive mode, such as creations and deletions of records. Additionally, in an interactive mode, wherein a user is logged in, all of the database journal entries can be flushed as a database manager has access to both the public and private keys.

In one embodiment, entries in a database journal in a non-interactive mode can be partially flushed (committing only a portion of the changes to the database) to maintain database performance. In particular, data records that require decryption prior to flushing a database journal entry can be bypassed in non-interactive mode, while data records that need not be decrypted can be flushed. For example, entries that relate to a creation or deletion of a data record can be performed, while entries relating to modification of an existing record can be bypassed and processed at a later point in time during an interactive mode of operation. Other embodiments also include a transformation of the database journal using a filter so that multiple entries to a same record can be combined. For example, if one database journal entry is a create-type request and another database journal entry for the same record is a modify-type request, these two requests can be combined into a single create-type request. Although modification-type requests can normally not be processed because decryption is required, in this particular case wherein there is a pending request to create the record in the first place, then no decryption is required. As a result, through filtering, the database journal entries can change type.

Figure 1:
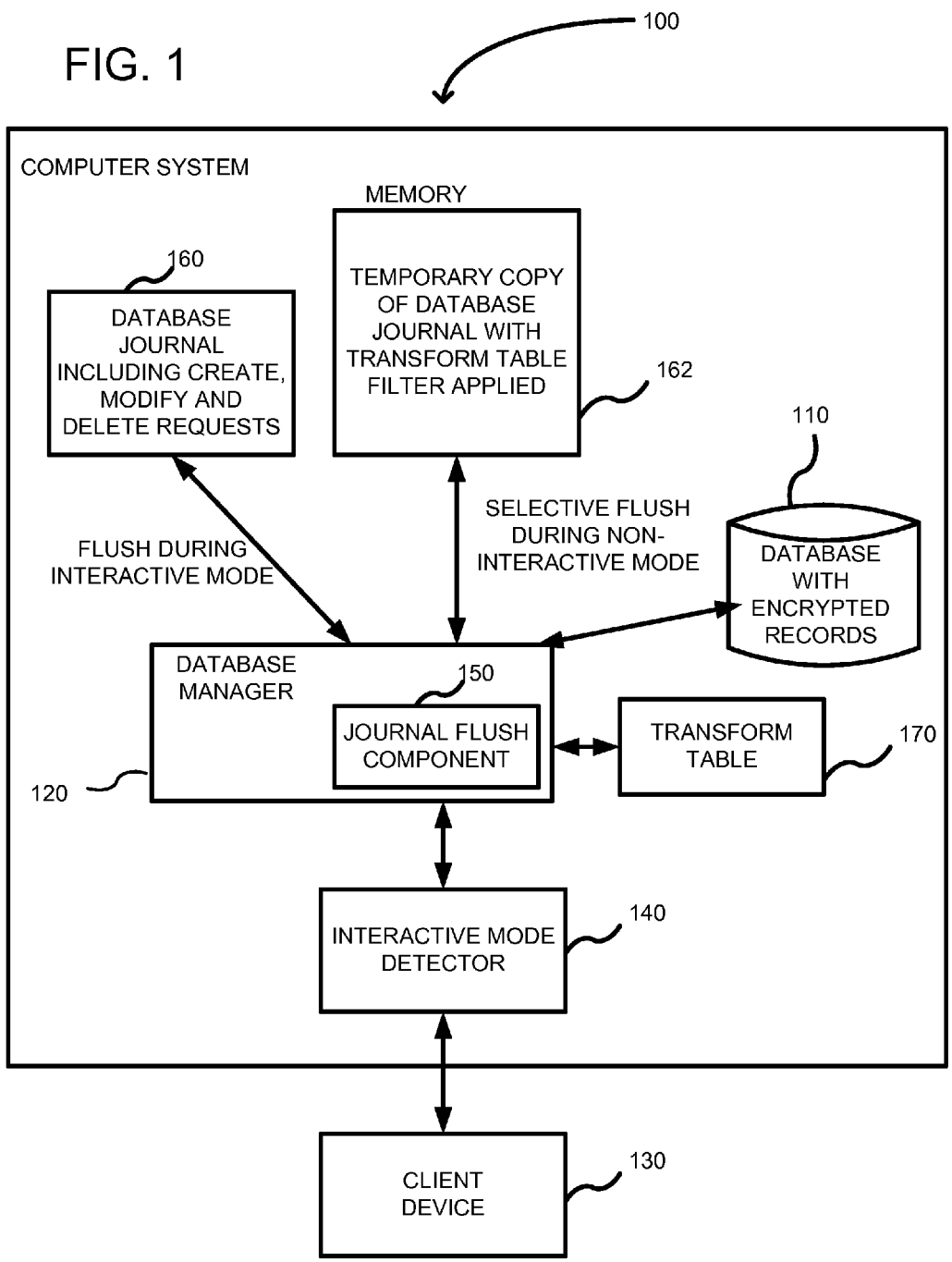
FIG. 1 is a system diagram of a computer system to selectively flush database journal entries.

FIG. 1 shows a system 100 used for flushing a database journal. "Flushing" as used herein means to process a request in at least one database journal entry, such that a change is made to the database based on the request. For example, for create-type requests, processing the request includes creating a new record in a database. A modification-type request includes modifying a record in the database. And a delete-type request means to delete a record in the database. Other types of requests can be used, but are not described herein for simplicity. A database 110 is shown having encrypted records. Because the records are encrypted, a database manager 120 can only decrypt the records when a user of a client device 130 is logged-in (i.e., the user actively has rights to gain access to the database after identification of the user, such as using a username and password). An interactive mode detector 140 can determine whether the user of the client device 130 is currently logged into the computer system 100 so that the user can access the database 110. Typically, the user enters a log-in identifier and a password, and the interactive mode detector 140 can authenticate the user's credentials to ensure that the user is authorized to access the database.

The database manager 120 can include a journal flush component 150. As new requests are received by the database manager 120 to access (read, write, modify, delete) records within the database 110, the requests are temporarily stored in a database journal 160. In an interactive mode, the journal flush component 150 can wait until a predetermined number of entries are present or a predetermined period of time passes before flushing the journal 160. Because both the private and public keys are available in the interactive mode, any of the entries within the journal can be processed. Each request in the database journal that is completed can be cleared from the journal so as to flush the request.

If the interactive mode detector 140 determines that the current mode is a non-interactive mode because the user is not logged in (the user does not have rights to access the database 110), then the journal flush component 150 implements a partial database journal flushing mode, as the private key is not available to decrypt records in the database 110. A temporary copy 162 of the database journal is generated in memory of the computer system 100. The temporary copy 162 can have multiple entries to a same record. The multiple requests to the same record can be combined to generate a single request in the temporary copy 162. In order to determine how to combine multiple requests to a same record, the request type is examined for each request and a transform table 170 is used to combine the requests. An example transform table 170 is as follows:

| existing | new | result |
|---|---|---|
| C | C | INVALID |
| C1 | M2 | C(1 + 2) |
| C | D | — |
| M | C | INVALID |
| M1 | M2 | M(1 + 2) |
| M | D | D |
| D | C | M |
| D | M | INVALID |
| D | D | INVALID |
| — | C | C |
| — | M | M |

Other transform tables can be used. Alternatively, the table 170 can be hard coded within the journal flush component 150. Most notably, a pending create request (C1) and a pending modify request (M2) can be combined into a single create request C(1+2). Additionally, any number of entries with a last entry that is a delete request can be combined to delete the record. Thus, the journal flush component 150 can first identify at least two database journal entries to a same record, and then use the types to find matching types in the transform table 170. The result column of the table can then be used to instruct the journal flush component 150 how to perform the combination to transform the multiple requests into a single request.

Once the transform table is applied to the temporary copy 162 of the database journal, the journal flush component can search in the results for entries that are either a create-type entry or a delete-type entry. Such entries can be processed (by adding or deleting records to the database 110) while other entries, such as modify-type requests are skipped for later processing. The processed entries can be deleted from the database journal 160, as they have been completed. Once the user logs into the computer system 100 using the client device 130, then the journal flush component 150 can flush the remaining requests from the database journal 160. By performing partial flushes while in a non-interactive mode, database performance is optimized by reducing the overall size of the database journal. Thus, when the user logs in, with a smaller database journal, the database can be synchronized with the database journal more quickly.

Figure 2:
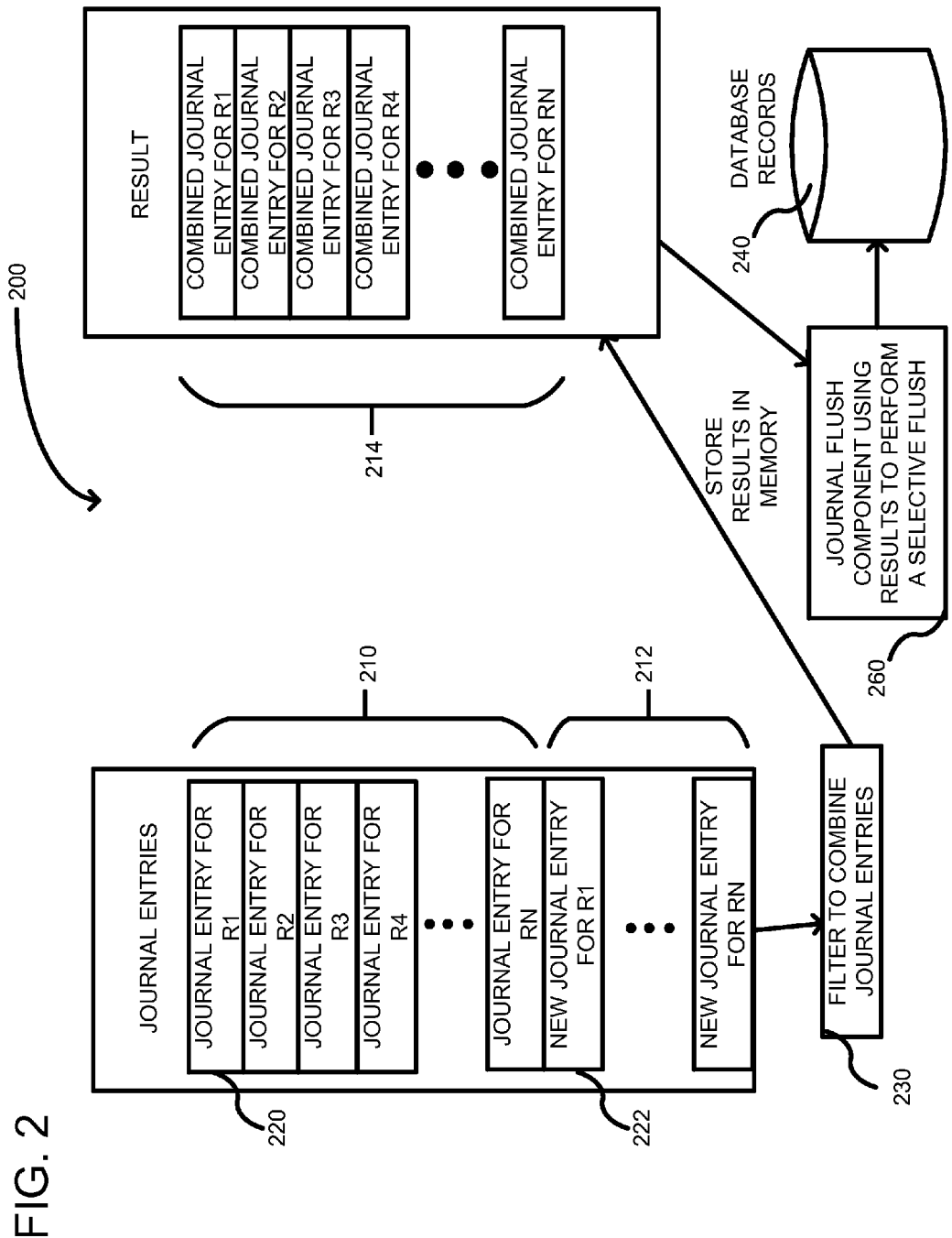
FIG. 2 is a diagram illustrating filtering of database journal entries.

FIG. 2 is a diagram 200 illustrating filtering of database journal entries by combining existing journal entries 210 with new entries 212 to obtain resultant entries 214. The existing entries 210 and new entries 212 can be for the same records. For example, an existing entry can be for record R1, as shown at 220. A new entry can be found in new entries 212 at 222 for the same record R1. Thus, at least two separate requests were made to modify the same record R1. A filter 230 can be applied to combine the existing and new journal entries that are associated with the same record. The journal entries represent a request to perform an action on database records 240 and the request can be associated with a request type. Example request types include create, modify and delete requests. Other types can be added, if desired. The combined entries are shown as results 214. It should be recognized that the existing entries 210, new entries 212 and resultant entries 214 can be formed in different areas of memory or a same area of memory can be used. For example, the existing entries and new entries can be intermingled, but searches are performed to find entries to a same record. The filter can then combine the entries and the result written back in the same memory location as one of the entries to replace the entry. The other entries that are not overwritten can then be deleted.

The resultant entries 214 represent a first group of journal entries having a same record and a second group of journal entries for which a combination was unnecessary as a record is associated with only a single journal entry. In any case, a journal flush component 260 can use the results to perform a selective flush of the database journal in a non-interactive mode. The selective flushing can be accomplished by searching for journal entries that can be satisfied without the requirement of decrypting records from database 240. Journal entries that do require decrypting can be bypassed in the non-interactive mode.

In a particular environment, the database journal entries can be associated with email updates and the database records are stored emails.

Figure 3:
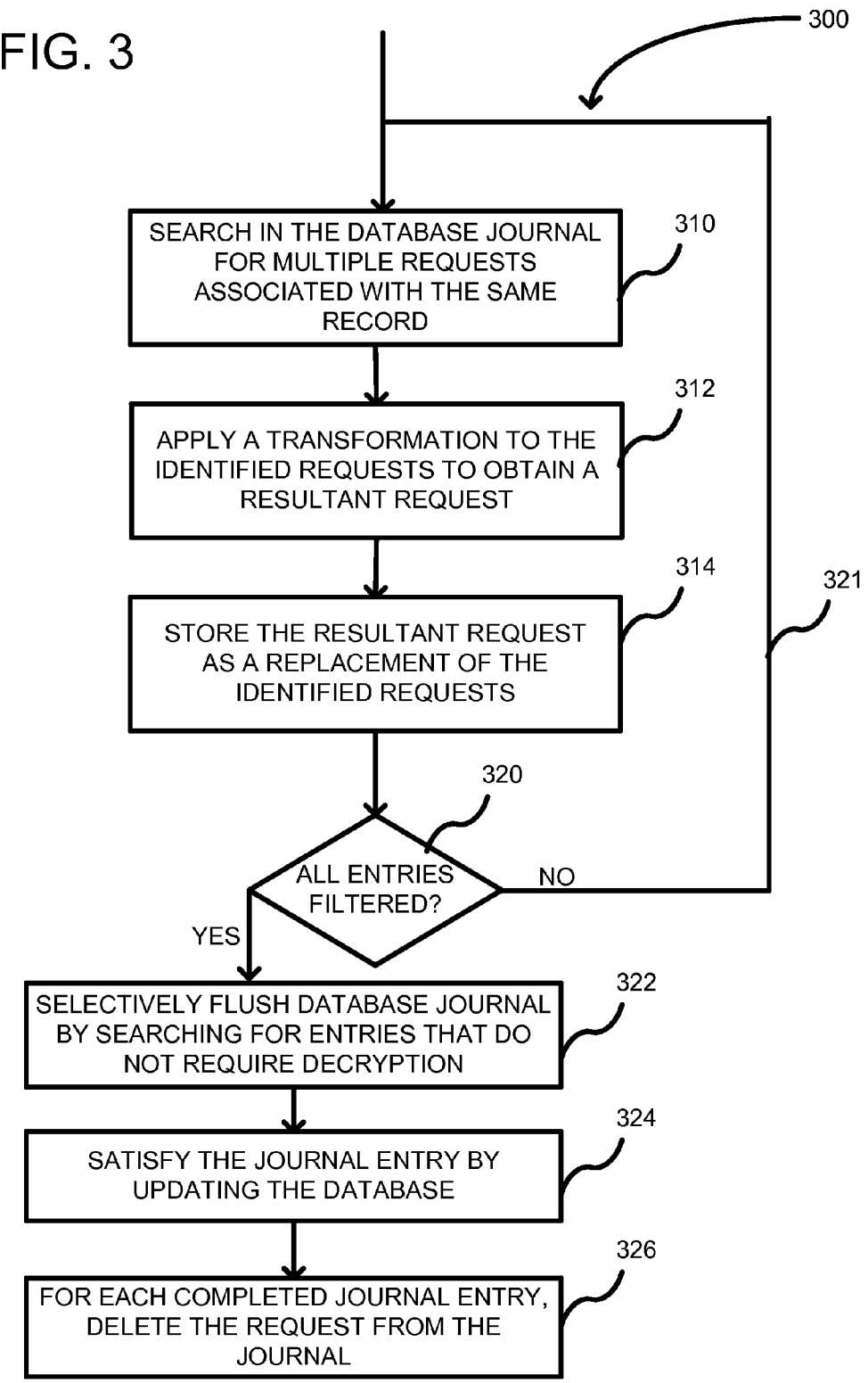
FIG. 3 is a flowchart of a method for transforming multiple journal entries to a same record to a single journal entry.

FIG. 3 is a flowchart 300 of a method for transforming multiple journal entries of a same record to a single journal entry. In process block 310, a search can be performed for multiple requests to a same record. For example, a record has an identifier, such as a Globally Unique Identifier (GUID), and that identifier can be searched on to determine if other journal entries are requests directed to the same database record. In process block 312, a transformation can be applied based on the request type to the journal entries to combine multiple journal entries directed to the same record. For example, a create type of request and a modify type of request can be transformed to a single create type request that includes the modification. In process block 314, a resultant request can be stored in the database journal, a temporary memory copy of the database journal or in some other location. In decision block 320, a determination is made whether the entries are all filtered. If not, then the process iterates over another record, as indicated by arrow 321. Otherwise, if so, then in process block 322, the database journal is selectively flushed by searching for entries that do not require decryption and acting on those requests. Entries that require decryption can be bypassed. In process block 324, for entries determined in process block 322, satisfy the request in the journal entry by performing the request so that the database records are updated (e.g., modified, deleted, created). In process block 326, for each completed request, the corresponding journal entry is cleared or otherwise deleted from the journal. Consequently, only a portion of the database journal is flushed, while another portion remains pending until an interactive mode is entered.

The loop formed by process blocks 310, 312, 314 and 320 can be performed by using other programming techniques. For example, a loop-less technique can be implemented using a table that records database entries that are present in the database journal as they are encountered. Each entry can be analyzed in turn and if an entry is found for a record and there exists another entry for the same record, then the filter can be immediately applied to such entries and the result posted in a resultant database journal. Still other techniques can be used as is well understood in the art.

Figure 4:
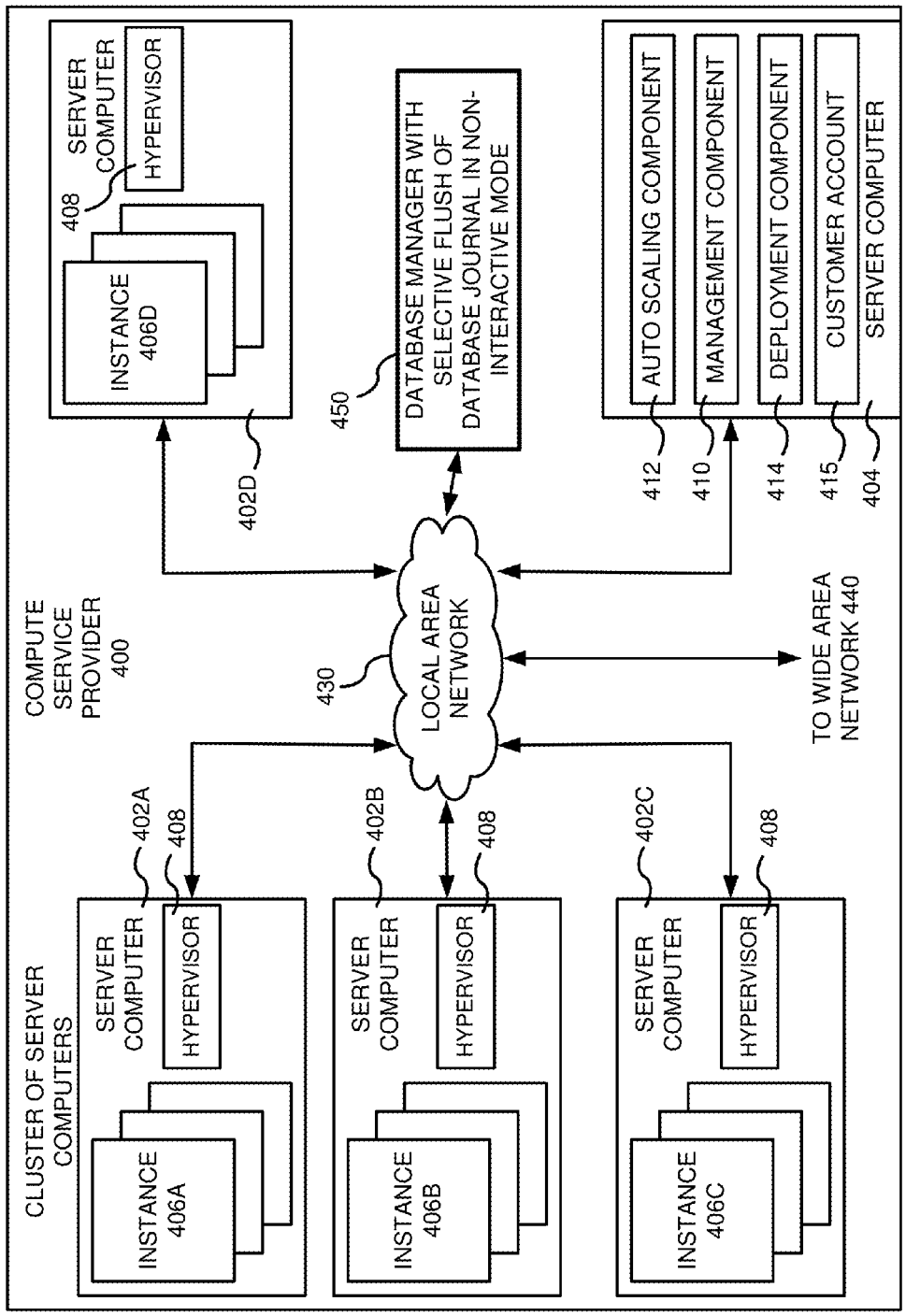
FIG. 4 is an example system diagram showing a plurality of virtual machine instances running in a multi-tenant environment with the database manager also running in the multi-tenant environment.

FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients. In an example embodiment, the compute service provider can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 400 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 400 using networked client devices, such as desktop computers, laptops, tablets, smartphones, etc. running web browsers or other lightweight client applications. Those skilled in the art will recognize that the compute service provider 400 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e. a computer) that executes applications like a physical machine. In the example of virtual machine, each of the servers 402A-402D can be configured to execute a hypervisor 408A-D or another type of program configured to enable the execution of multiple instances 406 on a single server. Additionally, each of the instances 406 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402 and the instances 406. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 430 can be utilized to interconnect the server computers 402A-402D and the server computer 404. The network 430 can be a local area network (LAN) and can be connected to a Wide Area Network (WAN) 440 so that end users can access the compute service provider 400. It should be appreciated that the network topology illustrated in FIG. 4 has been simplified and that many more networks and networking devices can be utilized to interconnect the various computing systems disclosed herein.

A database manager 450 can be executing on a separate server computer or as one of the instances 406 on a server computer 402 within the compute service provider 400. The database manager 450 can selectively flush a database journal while in a non-interactive mode. Selective flushing means that only journal entries that do not require decryption are acted upon while in the non-interactive mode. Journal entries that require decryption are acted upon once an interactive mode is entered so that a private key is available to the database manager.

Figure 5:
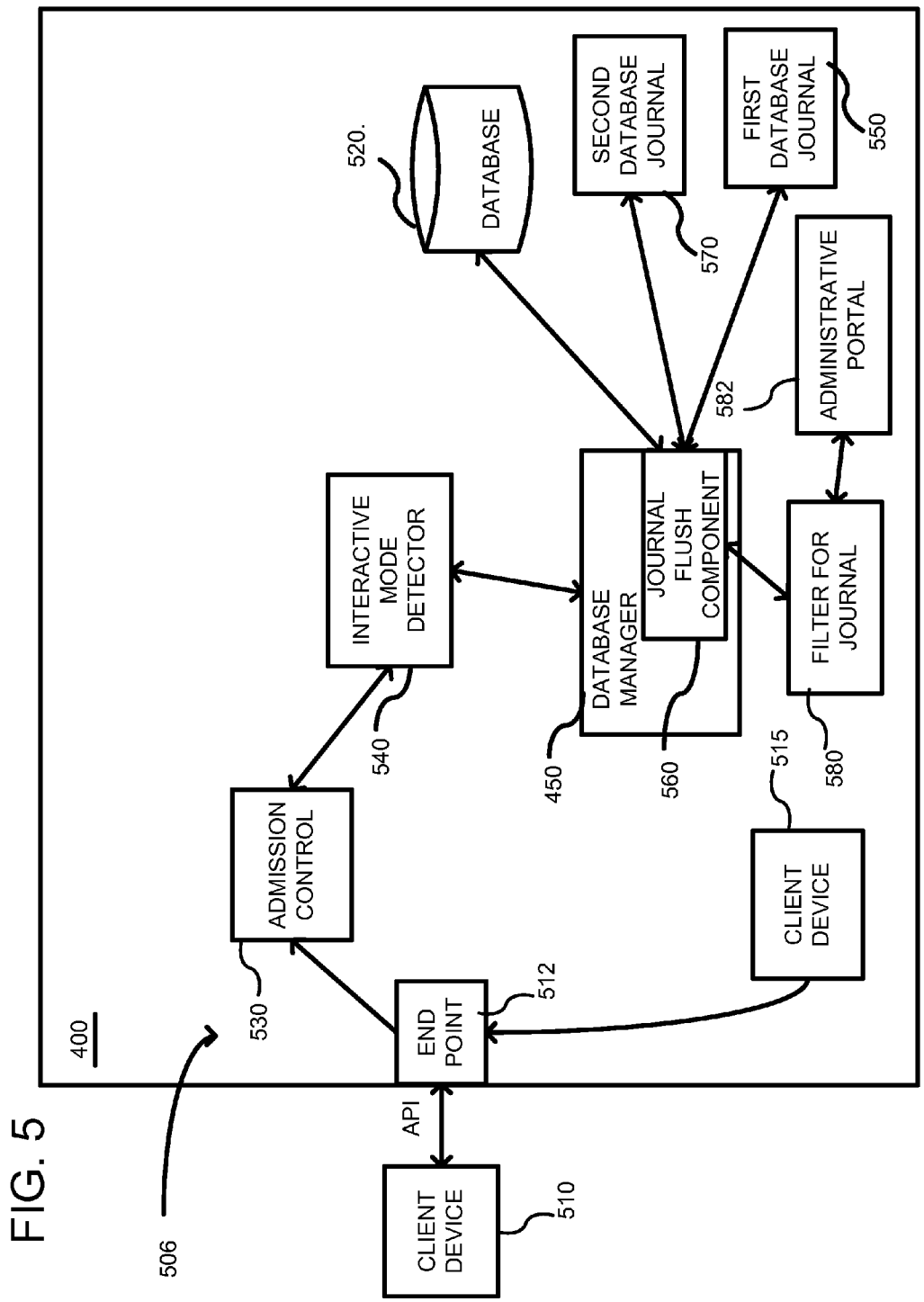
FIG. 5 shows further details of an example system including a plurality of management components associated with a control plane in the multi-tenant environment.

FIG. 5 illustrates in further detail management components 506 that can be used in the multi-tenant environment of the compute service provider 400. In order to access and utilize instances (such as instances 406 of FIG. 4), a client device 510 can be used. The client device 510 can be any of a variety of computing devices, mobile or otherwise including a cell phone, smartphone, handheld computer, Personal Digital Assistant (PDA), desktop computer, etc. The client device 510 can communicate with the compute service provider 400 through an end point 512, which can be a DNS address designed to receive and process API requests. In particular, the end point 512 can be a web server configured to expose an API. Using the API requests, a client 510 can make requests to implement any of the functionality described herein. Client devices 515 within the compute service provider 400 can likewise make API requests to the end point 512. The client device 515 can be executing on one of the instances 406 of FIG. 4. The client devices 510 and/or 515 can include requests to update records in a database 520. Example updates can include requests to modify, delete, and create records.

Other general management services that may or may not be included in the compute service provider 400 include an admission control 530, e.g., one or more computers operating together as an admission control web service. The admission control 530 can authenticate, validate and unpack the API requests for service or storage of data within the compute service provider 400. The admission control 530 can be subsumed within other components. An interactive mode detector 540, can be part of the admission control 530 or separated therefrom, and detects whether the communication session is in an interactive mode wherein the user is logged in and authenticated, or a non-interactive mode wherein the user is not logged in and/or not authenticated. In an interactive mode, user credentials can be authenticated or reliable tokens can be used. In a non-interactive mode, approved certificates can be used to receive requests to update records. Other techniques can be used for defining an interactive mode versus a non-interactive mode.

The database manager 450 can receive the requests from the client devices 510, 515 and store the requests in a first database journal 550. At predetermined time intervals or after a predetermined number of entries are present in the first database journal 550, a journal flush component 560 within the database manager can flush the database journal. However, the database 520 includes encrypted records that cannot be decrypted by the database manager 450 without being in an interactive mode. Consequently, the journal flush component 560 checks with interactive mode detector 540 to determine whether a user associated with the client device is logged on and authenticated and, consequently, in an interactive mode. If the user is logged in, then the first database journal 550 can be flushed (the database journal entries used to update records in the database) by obtaining the private key for the current user. However, if the user is in a non-interactive mode, then the journal flush component 560 can make a temporary copy of the first database journal 550, as shown at 570. The copy 570 can be stored in memory and is a working copy that the journal flush component 560 can use and to which a filter 580 can be applied. As indicated at 582, an administrative portal can be used to update the filter to change filter parameters. For example, different table entries can be inserted to alter the filter operation. The filter 580 can be applied to the second database journal 570 to combine requests associated with the same record. Combining of entries can change the entries type. For example, as described above, a create and a modify entry can be transformed to a create entry. The combined requests within the second database journal can be analyzed and only those that do not require decryption can be flushed, while others can be bypassed. In an alternative embodiment, using a filter to combine entries need not be used. Instead, a simple analysis can be performed on the first database journal 550, wherein each entry is examined based on type and those that do not require decryption are acted upon in a non-interactive mode.

Figure 6:
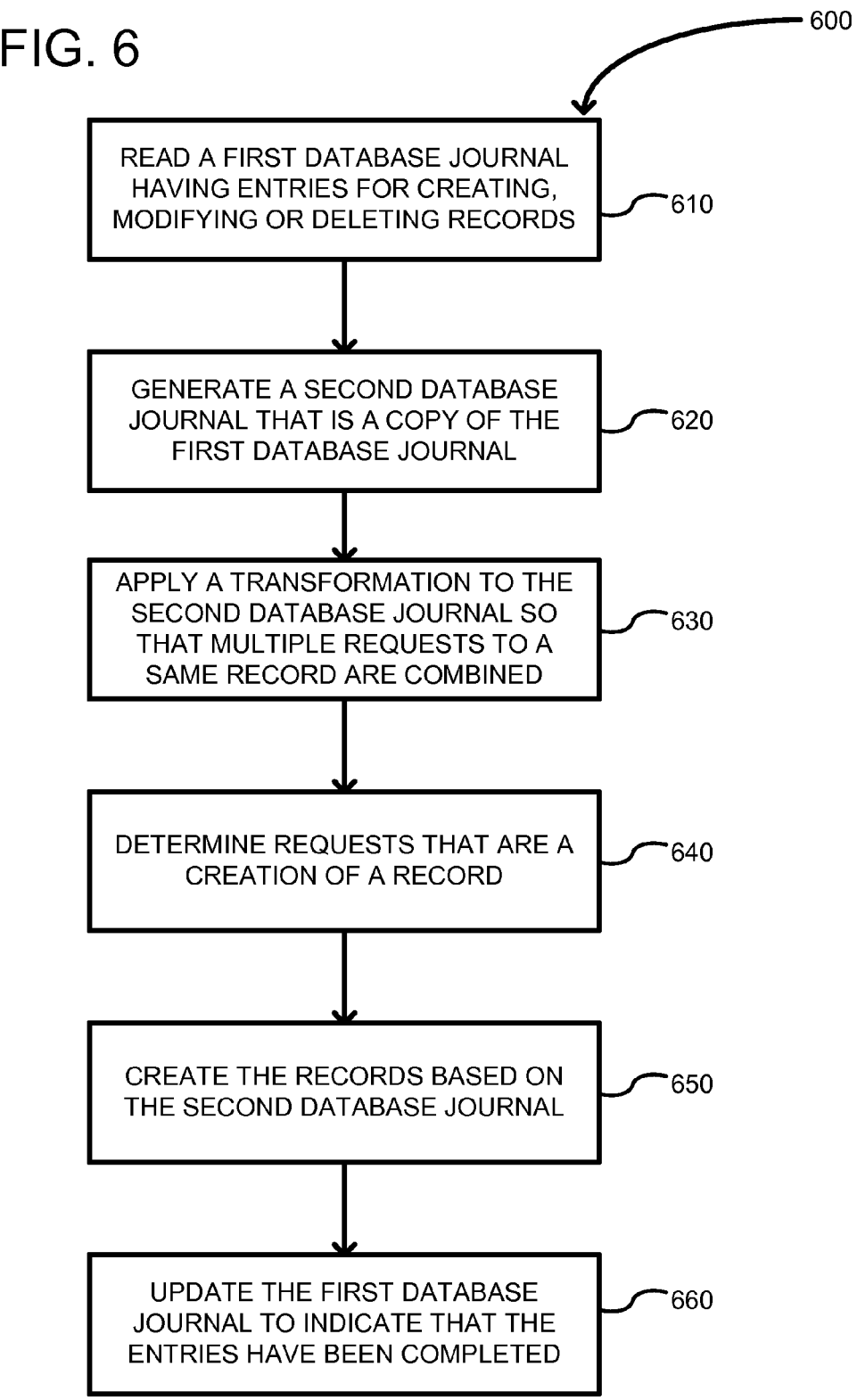
FIG. 6 shows an example flowchart of a method for selectively flushing a database journal.

FIG. 6 shows a flowchart 600 of a method for using a database journal. In process block 610, a first database journal is read having entries for creating, modifying or deleting records. The database can be in a non-interactive mode for the particular user, such as if the user is not currently logged in. In process block 620, a second database journal is generated that is a copy of the first database journal. The second database journal can be a temporary copy that is stored in memory. In process block 630, a transformation can be applied to the second database journal so that multiple requests for the same record can be combined. In some of the requests, the request type can be changed. For example, a creation request and a modification request can be transformed into a combined creation request. In process block 640, a determination is made for requests in the transformed second database journal that are of type creation. That is, requests that result in creation of a new record. In process block 650, a new record is created in the database. In the case of an email database, a new email can be stored. In process block 660, the first database journal is updated to indicate the entries that have been completed.

Although not shown, a determination can also be made if the record is a delete-type of request, and such records can be deleted from the database.

Figure 7:
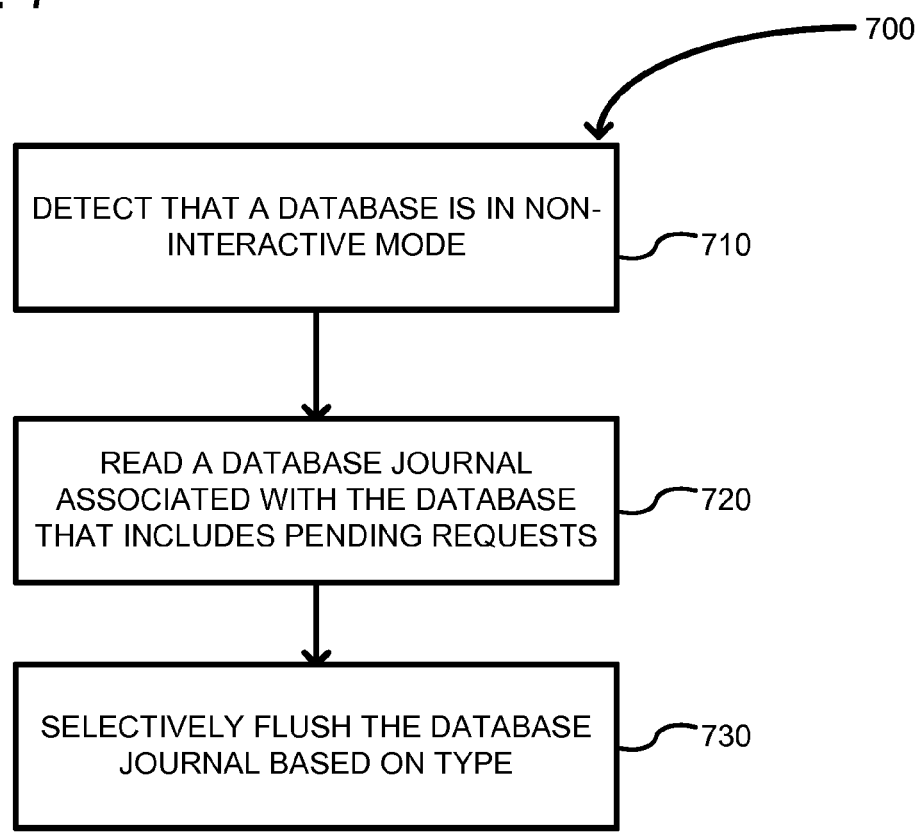
FIG. 7 shows an example flowchart of a method according to another embodiment for selectively flushing the database journal.
Figure 8:
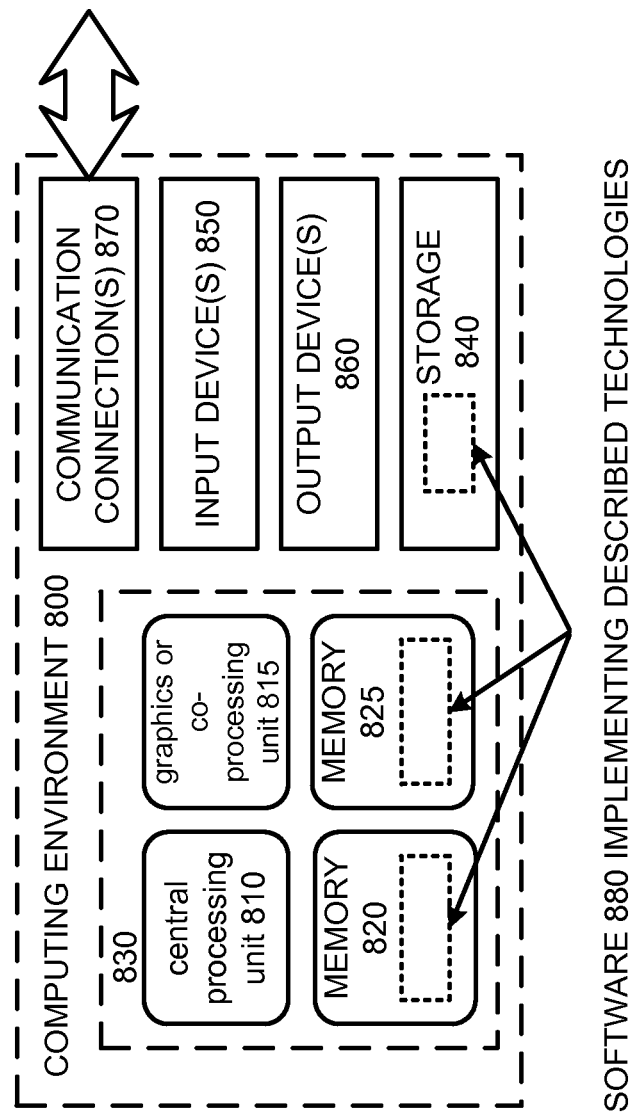
FIG. 8 depicts a generalized example of a suitable computing environment in which the described innovations may be implemented.

FIG. 7 shows a flowchart 700 of a method according to another embodiment for using a database journal. In process block 710, a detection is made that a database is in non-interactive mode. For example, a compute service provider can include an authentication component and/or an interactive mode detector that can determine whether the user is logged in. Although the database can be associated with many users, some of the users can be in non-interactive mode and others in interactive mode. Thus, the particular portion of the database is examined with respect to the user to determine the current mode. In a specific example, the database can be divided into different mailboxes for different users, and if a user is accessing his or her mailbox, then the database can be considered in interactive mode with respect to that user despite that other users can be in a non-interactive mode. In process block 720, a database journal can be read that is associated with pending requests. The requests can have associated types, such as create, modify and delete. In process block 730, the database can be selectively flushed meaning that some of the entries of the database are flushed and others not. The flushed entries have their requests satisfied through modification of the database, while unflushed requests remain pending. Flushed entries can be selected based on type, as certain types of requests can be carried out in non-interactive mode, while others cannot. Selectively flushing the database can include generating a temporary data journal in memory and for each journal entry applying a transformation table to the entry to obtain a resultant request. The resultant request can replace the entry. Once the database returns to an interactive mode, the remaining records in the database can be flushed regardless of type.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s). For example, the database manager can be implemented using software 1080.

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A method of flushing a database journal, the method comprising:
   in a non-interactive mode, wherein a user is not logged-in to access a database having records that are encrypted, reading a first database journal, the database journal having a plurality of entries including requests for creating, modifying or deleting the records within the database;
   generating a second database journal that is a copy of the first database journal;
   applying a transformation to the second database journal, wherein multiple of the requests to a first record are combined to generate a single request for the first record;
   based on the transformation of the second database journal, determining creation-type requests for creation of one or more new records in the database;
   creating one or more the new records based on the determined creation-type requests in the second database journal; and
   updating the first database journal to delete entries having requests that were completed, while other requests that cannot be performed in the non-interactive mode remain in the first database journal so as to partially flush the first database journal in the non-interactive mode;
   entering an interactive mode and flushing remaining entries in the first database journal so that flushing of the first database journal is treated differently depending on which of the non-interactive or interactive mode is entered.

2. The method of claim 1, further including waiting for the first database journal to exceed a predetermined number of entries before fully flushing the first database journal.

3. The method of claim 2, wherein flushing the first database journal includes updating the database in accordance with the requests.

4. The method of claim 1, wherein the second database journal includes a first creation request and a first modification request on a same record, and wherein combining includes generating a second creation request that includes the first creation request together with the first modification request.

5. The method of claim 1, wherein applying the transformation includes using a transformation table that provides resulting database journal entries for varying combinations of multiple requests.

6. A computer-readable storage medium including instructions that upon execution cause a computer system to:
   detect that a database including multiple records is in a non-interactive mode of operation, the database including records that are encrypted;
   read a database journal associated with the database that includes pending requests having types associated with creating, modifying or deleting records in the database; and
   selectively flush the database journal based on the type by satisfying the requests that are an allowable type to be flushed in the non-interactive mode, while leaving other requests in the database journal that are not an allowable type to be flushed in the non-interactive mode of operation so that flushing of the database journal changes based on whether in the interactive mode or a non-interactive mode.

7. The computer-readable storage medium according to claim 6, wherein the instructions, upon execution, further cause the computer system to:
   search through the database journal for multiple entries associated with a same record and combine the multiple entries into a single entry.

8. The computer-readable storage medium according to claim 7, wherein combining includes combining a create-type request with a modify-type request to generate a single create-type request.

9. The computer-readable storage medium according to claim 6, wherein selectively flushing includes searching through the database journal entries and for request types that are modify, bypassing the database journal entry, and for request types that are a create or delete, executing the requests.

10. The computer-readable storage medium according to claim 6, wherein the instructions, upon execution, further cause the computer system to:
    detect that the database is in an interactive mode and flush remaining records in the database journal regardless of the type.

11. The computer-readable storage medium according to claim 6, wherein the instructions, upon execution, further cause the computer system to:
    generate a temporary database journal in memory; and
    for each journal entry of the temporary database journal, apply a transformation table to the entry and use a result to replace the entry.

12. The computer-readable storage medium according to claim 6, wherein database records are unreadable to a service provider in the non-interactive mode.

13. The computer-readable storage medium according to claim 6, wherein the instructions, upon execution, further cause the computer system to:
    identify a first modify-type request for a first entry in the database journal associated with a first record;
    identify a second modify-type request for a second entry in the database journal associated with the first record; and
    combine the first modify-type request with the second modify-type request to create a third modify-type request for the first record and delete the first and second modify-type requests.

14. The computer-readable storage medium according to claim 6, wherein the instructions, upon execution, further cause the computer system to:
    wait for the database journal to exceed a predetermined number of entries prior to performing the selective flushing.

15. The computer-readable storage medium according to claim 6, wherein the database is an email database and the requests are to modify, delete, or create emails.

16. A system for updating a database, comprising:
    a database for storing encrypted records;
    storage for storing a database journal that includes updates to the encrypted records; and
    a database manager coupled to the database and the storage, the database manager for selectively updating the encrypted records in the database so that which database journal entries are flushed depends upon whether a communication session associated with the encrypted records is in an interactive mode or a non-interactive mode, with a partial flush of the database journal entries occurring in a non-interactive mode and a full flush of the database entries occurring in the interactive mode.

17. The system of claim 16, wherein the database, storage and database manager are within a service provider of a multi-tenant environment.

18. The system of claim 16, further including an interactive mode detector coupled to the database manager for requesting whether the user is logged-in and authenticated for determining whether the communication session is in the interactive mode or non-interactive mode.

19. The system of claim 16, further including a filter for combining multiple entries in the database journal into a single entry.

20. The system of claim 16, further including flushing database journal entries for modify-type requests in the interactive mode.

* * * * *